United States Patent
Ridealgh et al.

(10) Patent No.: US 10,131,572 B2
(45) Date of Patent: Nov. 20, 2018

(54) HEAT TREATABLE COATED GLASS PANE

(71) Applicant: PILKINGTON GROUP LIMITED, Lathom (GB)

(72) Inventors: John Andrew Ridealgh, Cuddington (GB); John Buckett, High Legh (GB); John William Oldfield, St. Helens (GB); Rebecca Sheridan, Northwich (GB)

(73) Assignee: Pilkington Group Limited, Lathom (GB)

( * ) Notice: Subject to any disclaimer, the term of this patent is extended or adjusted under 35 U.S.C. 154(b) by 0 days.

(21) Appl. No.: 14/392,096

(22) PCT Filed: Apr. 2, 2014

(86) PCT No.: PCT/GB2014/051028
§ 371 (c)(1),
(2) Date: Oct. 7, 2015

(87) PCT Pub. No.: WO2014/167293
PCT Pub. Date: Oct. 16, 2014

(65) Prior Publication Data
US 2016/0031750 A1 Feb. 4, 2016

(30) Foreign Application Priority Data

Apr. 11, 2013 (GB) .................................. 1306611.3

(51) Int. Cl.
B32B 17/06 (2006.01)
C03C 17/34 (2006.01)
C03C 17/36 (2006.01)

(52) U.S. Cl.
CPC ...... *C03C 17/3435* (2013.01); *C03C 17/3482* (2013.01); *C03C 17/36* (2013.01); *C03C 17/366* (2013.01); *C03C 17/3636* (2013.01); *C03C 17/3639* (2013.01); *C03C 17/3644* (2013.01); *C03C 17/3681* (2013.01)

(58) Field of Classification Search
USPC ....... 428/426, 428, 432, 688, 689, 697, 699, 428/701, 702
See application file for complete search history.

(56) References Cited

U.S. PATENT DOCUMENTS

| | | | | |
|---|---|---|---|---|
| 4,816,054 A | * | 3/1989 | Schmitte | C03C 17/22 428/145 |
| 5,935,702 A | * | 8/1999 | Macquart | B32B 17/10174 359/359 |
| 6,602,587 B2 | | 8/2003 | Macquart et al. | |
| 6,650,478 B1 | * | 11/2003 | DeBusk | C03C 17/36 359/359 |
| 6,804,048 B2 | | 10/2004 | Macquart et al. | |
| 7,037,577 B2 | | 5/2006 | Macquart et al. | |
| 7,901,781 B2 | * | 3/2011 | Maschwitz | B32B 17/10036 428/212 |
| 2005/0123772 A1 | * | 6/2005 | Coustet | C03C 17/36 428/432 |
| 2005/0196632 A1 | | 9/2005 | Maschwitz et al. | |
| 2006/0134436 A1 | | 6/2006 | Maschwitz | |
| 2006/0219293 A1 | * | 10/2006 | Morooka | H01L 31/022425 136/258 |
| 2009/0047509 A1 | * | 2/2009 | Gagliardi | C03C 17/36 428/336 |
| 2009/0136765 A1 | * | 5/2009 | Maschwitz | B32B 17/10036 428/432 |
| 2009/0169846 A1 | * | 7/2009 | Siddle | C03C 17/36 428/216 |
| 2010/0136365 A1 | * | 6/2010 | Unquera | C03C 17/36 428/623 |

FOREIGN PATENT DOCUMENTS

| | | |
|---|---|---|
| EP | 0718250 A2 | 6/1996 |
| EP | 0747329 A1 | 11/1996 |
| JP | H07223841 A | 8/1995 |
| WO | 2007/080428 A1 | 7/2007 |
| WO | 2009067263 A1 | 5/2009 |

OTHER PUBLICATIONS

European Patent Office; International Search Report; dated Jun. 18, 2014; 3 pages; European Patent Office, Rijswijk, Netherlands.

\* cited by examiner

*Primary Examiner* — Lauren R Colgan
(74) *Attorney, Agent, or Firm* — Marshall & Melhorn, LLC

(57) ABSTRACT

A coated glass pane comprising at least the following layers: a glass substrate; and at least one absorbing layer based on at least one metal silicide and/or metal silicide nitride wherein the at least one absorbing layer is embedded between and contacts two layers based on an (oxi) nitride of Si and/or an (oxi) nitride of Al and/or alloys thereof.

13 Claims, No Drawings

HEAT TREATABLE COATED GLASS PANE

BACKGROUND OF THE INVENTION

The invention relates to heat treatable coated glass panes with a low-emissivity (low-e) and/or solar control coating. The invention also relates to methods of manufacturing said panes.

Heat treated glass panes which are toughened to impart safety properties and/or are bent are required for a large number of areas of application, for example for architectural or motor vehicle glazings. It is known that for thermally toughening and/or bending glass panes it is necessary to process the glass panes by a heat treatment at temperatures near or above the softening point of the glass used and then either to toughen them by rapid cooling or to bend them with the aid of bending means. The relevant temperature range for standard float glass of the soda lime silica type is typically about 580-690° C., the glass panes being kept in this temperature range for several minutes before initiating the actual toughening and/or bending process.

"Heat treatment", "heat treated" and "heat treatable" in the following description and in the claims refer to thermal bending and/or toughening processes such as mentioned before and to other thermal processes during which a coated glass pane reaches temperatures in the range of about 580-690° C. for a period of several minutes, e.g., for up to about 10 minutes. A coated glass pane is deemed to be heat treatable if it survives a heat treatment without significant damage, typical damages caused by heat treatments being high haze values, pinholes or spots.

The inventors of the present invention have found that the parameter "haze" usually referred to when characterising the heat treatability of low-e and/or solar control coatings is often insufficient, as it does not fully reflect all types of defects that may arise during coating, heat treating, processing and/or handling of coated glass panes. Some of the known heat treatable coated glass panes show significant and clearly noticeable modifications of their optical properties and particularly of their reflection colour during a heat treatment.

It is desirable to be able to manufacture a range of coated products with a variety of light and/or heat transmission values in order to meet particular needs. One approach to address this objective is to use a common multilayer stack or platform for each of the different product types (e.g. low-e and solar control, and both toughenable and non-toughenable products) and then tune the optical properties of the stack by adding different thicknesses of an absorbing layer into each of the stacks.

In the context of the present invention, where a layer is said to be an "absorbing layer" this means that the layer has measurable absorption within the solar energy spectrum, including but not limited to the visible part of the spectrum.

Certain absorbing layers are known in the prior art. For instance, EP 0718250 A2 describes a coating stack with a protective metallic layer (e.g. Nb, Ta, Ti, Cr, Ni, NbTa, TaCr, or NiCr) located directly above a functional metallic layer such as silver. The thickness of the protective metallic layer may be modified to adjust the light transmission.

U.S. Pat. No. 4,816,054 A describes the coating of glass with single metal silicide functional layers (see claim 1) and specifically mentions the use of $FeSi_2$, NiSi and $NiSi_2$. No mention is made of other iron silicide layers or particular locations of metal silicide layers in multilayer stacks (the examples are all single coatings).

U.S. 2005196632 A1 describes protective layers of, e.g., Zr silicide. Fe and Ni silicides are mentioned but no specific examples are given (see paragraph [0031]).

DETAILED DESCRIPTION OF THE INVENTION

According to a first aspect of the present invention there is provided a coated glass pane comprising at least the following layers:
a glass substrate; and
at least one absorbing layer based on at least one metal silicide and/or metal silicide nitride wherein the at least one absorbing layer is embedded between and contacts two layers based on an (oxi)nitride of Si and/or an (oxi)nitride of Al and/or alloys thereof.

The present invention provides multilayer coated glass panes that include an absorbing layer which enables the optical properties, such as solar energy and/or light transmittance, of the panes to be fine tuned according to the thickness of the absorbing layer. The arrangement of the present invention enables high solar energy and/or light absorption even when relatively thin absorbing layers are used. Thicker absorbing layers are undesirable from a manufacturing standpoint because of the need to use higher power with the cathode target (this is expensive), use multiple cathode targets (this is expensive and inconvenient) and/or reduce the line speed (this adversely affects production volumes).

The panes of the present invention exhibit low haze and preferably relatively neutral transmitted or reflected colours before and after heat treatment (the test was to heat a 4 mm thick sample at 650° C. for 5 minutes). Indeed, the optical properties overall undergo minimal changes during heat treatment which is of course advantageous from a manufacturing perspective.

In the following discussion of the invention, unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

In the context of the present invention, where a layer is said to be "based on" a particular material or materials, this means that the layer predominantly consists of the corresponding said material or materials, which means typically that it comprises at least about 50 at. % of said material or materials.

The at least one absorbing layer may comprise a layer based on a silicide and/or a silicide nitride of a metal or metal alloy from the elements selected from titanium, vanadium, chromium, manganese, iron, cobalt, nickel, zirconium, hafnium, niobium, tantalum, molybdenum, tungsten and/or aluminium.

The at least one absorbing layer may comprise a layer based on TiSi, $TiSi_2$, $Ti_5Si_3$, $V_3Si$, $V_2Si$, VSi, $Cr_3Si$, $Cr_2Si$, CrSi, $CrSi_2$, $MnSi_2$, $FeSi_n$, where n is any integer or fraction from 1 to 9, $Fe_mSi$, where m is any integer or fraction from 1 to 9, $CoSi_2$, $Ni_2Si$, NiSi, $NiSi_2$, $NiSi_6$, $NiCrSi_2$, $Zr_4Si$, $Zr_2Si$, $Zr_3Si_2$, $Zr_4Si_3$, $Zr_6Si_5$, ZrSi, $ZrSi_2$, HfSi, $HfSi_2$, $Nb_2Si$, $NbSi_2$, $Ta_5Si$, $Ta_5Si_2$, $Ta_5Si_3$, $TaSi_2$, $MO_3Si$, $MO_3Si_2$, $MoSi_2$, $W_3Si_2$, $WSi_2$, $Al_4Si_3$ and/or $AlSi_2$ and/or nitrides thereof.

Where the at least one absorbing layer is based on $FeSi_n$ and/or nitrides thereof, preferably n is any integer or fraction from 1 to 5, more preferably from 1 to 4. For example, the at least one absorbing layer may be based on $Fe_2Si_3$.

Where the at least one absorbing layer is based on $Fe_mSi$ and/or nitrides thereof, preferably m is any integer or fraction from 2 to 5, more preferably from 2 to 4, such as 3. For example, the at least one absorbing layer may be based on $Fe_3Si$.

The at least one absorbing layer may comprise a layer based on a silicide and/or a silicide nitride of a metal or metal alloy from the elements with atomic numbers 22 to 28.

According to a second aspect of the present invention there is provided a coated glass pane comprising at least the following layers:

a glass substrate; and at least one absorbing layer based on one or more of $Fe_2Si_3$, $FeSi_n$, where n is any integer or fraction greater than or equal to 1 but less than 2 or greater than 2 but up to 9, and/or $Fe_mSi$, where m is any integer or fraction from 1 to 9, and/or nitrides thereof.

The second aspect of the present invention provides single or multilayer coated glass panes that include an iron silicide absorbing layer which enables the energetic and/or optical properties, such as solar energy and/or light transmittance, of the panes to be fine tuned according to the thickness of the absorbing layer. The arrangement of the second aspect of the present invention enables high solar energy and/or light absorption even when relatively thin absorbing layers are used. The panes of the second aspect of the present invention also exhibit low haze and preferably relatively neutral transmitted or reflected colours before and after heat treatment. Indeed, the optical properties overall undergo minimal changes during heat treatment.

In the second aspect of the present invention, where the at least one absorbing layer is based on $FeSi_n$ and/or nitrides thereof, preferably n is any integer or fraction from 1 to 1.95 or greater than 2.05 but up to 9, more preferably from 1 to 1.90 or greater than 2.10 but up to 9, even more preferably from 1 to 1.8 or greater than 2.2 but up to 9, even more preferably from 1 to 1.6 or greater than 2.5 but up to 9. Preferably n is at most 6, more preferably at most 5, even more preferably at most 4.

In the second aspect of the present invention, where the at least one absorbing layer is based on $Fe_mSi$ and/or nitrides thereof, preferably m is any integer or fraction from 2 to 5, more preferably from 2 to 4, such as 3.

In the second aspect of the present invention, preferably the at least one absorbing layer is based on one or more of $Fe_2Si_3$, $FeSi_n$, where n is any integer or fraction greater than or equal to 1 but less than 2 or greater than 2 but up to 9, and/or $Fe_mSi$, where m is any integer or fraction from 1 to 9. Tests have shown that panes coated with a thin layer of these iron silicides exhibit comparable solar energy and/or light absorption to panes that are coated with much thicker layers of the corresponding iron silicide nitride, or $NiSi_2$ or $NiSiN_x$. As detailed above, thicker absorbing layers are undesirable from a manufacturing standpoint because of the need to use higher power with the cathode target (this is expensive), use multiple cathode targets (this is expensive and inconvenient) and/or reduce the line speed (this adversely affects production volumes).

In the second aspect of the present invention, preferably the at least one absorbing layer is based on $Fe_2Si_3$.

In the second aspect of the present invention, preferably the at least one absorbing layer contacts at least one layer based on an (oxi)nitride of Si and/or an (oxi)nitride of Al and/or alloys thereof. More preferably the at least one absorbing layer is embedded between and contacts two layers based on an (oxi)nitride of Si and/or an (oxi)nitride of Al and/or alloys thereof. This arrangement is beneficial in terms of exhibiting the lowest haze and having the potential to achieve the most neutral transmitted or reflected colours before and after heat treatment.

The following optional features are applicable to all aspects of the present invention in any combination and in any number:

Preferably the at least one absorbing layer contacts at least one layer based on a nitride of Al. More preferably the at least one absorbing layer is embedded between and contacts two layers based on a nitride of Al.

Preferably the pane further comprises a silver-based functional layer.

Preferably the pane further comprises a lower anti-reflection layer located between the glass substrate and the silver-based functional layer.

Preferably the pane further comprises an upper anti-reflection layer located above the silver-based functional layer.

In some embodiments the pane comprises more than one silver-based functional layer. For example, the pane may comprise two, three or more silver-based functional layers. When the pane comprises more than one silver-based functional layer, each silver-based functional layer may be spaced apart from an adjacent silver-based functional layer by a central anti-reflection layer. By providing more than one silver-based functional layer, the functional layers may be spaced by intervening dielectric layers (=central anti-reflection layers) to form a Fabry-Perot interference filter, whereby the optical properties of the low-e and/or solar control coating may be further optimized for the respective application, as is well known in the art.

The at least one absorbing layer may be located in the lower anti-reflection layer, the upper anti-reflection layer and/or a central anti-reflection layer of a coating comprising two or more silver-based functional layers. Preferably the at least one absorbing layer is located in the upper anti-reflection layer and/or a central anti-reflection layer. These locations are advantageous in terms of minimising the haze and providing the most neutral colours after a heat treatment. More preferably the at least one absorbing layer is located in a central anti-reflection layer. A central anti-reflection layer is the best location in terms of low haze and neutral colours after a heat treatment.

The at least one absorbing layer may preferably have a thickness of at least 0.5 nm, more preferably at least 1 nm, even more preferably at least 2 nm, most preferably at least 3 nm; but preferably at most 12 nm, more preferably at most 10 nm, even more preferably at most 9 nm, most preferably at most 8 nm. As detailed above, thinner absorbing layers are desirable for a number of reasons.

The layer(s) based on an (oxi)nitride of Si and/or an (oxi)nitride of Al and/or alloys thereof may each independently preferably have a thickness of at least 3 nm, more preferably at least 5 nm, even more preferably at least 6 nm, most preferably at least 7 nm; but preferably at most 30 nm, more preferably at most 25 nm, even more preferably at most 21 nm, most preferably at most 19 nm.

The lower anti-reflection layer of a coating comprising at least one silver-based functional layer may comprise at least a combination of one or more of the following layers:

a base layer based on an (oxi)nitride of Si and/or an (oxi)nitride of Al and/or alloys thereof; and/or an oxide of Ti; and/or an oxide of Zr;

a layer based on a metal oxide, such as an oxide of Zn and Sn and/or an oxide of Sn;

a separation layer based on a metal oxide and/or an (oxi) nitride of Si and/or an (oxi)nitride of Al and/or alloys thereof; and a top layer based on an oxide of Zn.

Preferably the lower anti-reflection layer comprises at least, in sequence from the glass substrate, a base layer based on an (oxi)nitride of Si and/or an (oxi)nitride of Al and/or alloys thereof; and/or an oxide of Ti; and/or an oxide of Zr;

a layer based on a metal oxide, such as an oxide of Zn and Sn and/or an oxide of Sn; and a top layer based on an oxide of Zn.

The lower anti-reflection layer may consist of the three layers in sequence as set out above.

In some embodiments the lower anti-reflection layer comprises, in sequence from the glass substrate, a base layer based on an (oxi)nitride of Si and/or an (oxi)nitride of Al and/or alloys thereof; and/or an oxide of Ti; and/or an oxide of Zr;

a layer based on a metal oxide, such as an oxide of Zn and Sn and/or an oxide of Sn;

a separation layer based on a metal oxide and/or an (oxi)nitride of Si and/or an (oxi)nitride of Al and/or alloys thereof; and a top layer based on an oxide of Zn.

The base layer based on an (oxi)nitride of Si and/or an (oxi)nitride of Al and/or alloys thereof; and/or an oxide of Ti; and/or an oxide of Zr of the lower anti-reflection layer may have a thickness of at least 5 nm, preferably from 5 to 60 nm, more preferably from 10 to 50 nm, even more preferably from 20 to 45 nm, most preferably from 30 to 40 nm. This base layer serves as a glass side diffusion barrier amongst other uses.

The term "(oxi)nitride of Si" encompasses both Si nitride ($SiN_x$) and Si oxinitride ($SiO_xN_y$) whilst the term "(oxi)nitride of Al" encompasses both Al nitride ($AlN_x$) and Al oxinitride ($AlO_xN_y$). Si nitride, Si oxinitride, Al nitride and Al oxinitride layers are preferably essentially stoichiometric (e.g. Si nitride=$Si_3N_4$, x=1.33) but may also be substoichiometric or even super-stoichiometric, as long as the heat treatability of the coating is not negatively affected thereby. One preferred composition of the base layer based on an (oxi)nitride of Si and/or an (oxi)nitride of Al and/or alloys thereof of the lower anti-reflection layer is an essentially stoichiometric mixed nitride $Si_{90}Al_{10}N_x$.

Layers of an (oxi)nitride of Si and/or an (oxi)nitride of Al and/or alloys thereof may be reactively sputtered from Si- and/or Al-based targets respectively in a sputtering atmosphere containing nitrogen and argon. An oxygen content of the base layer based on an (oxi)nitride of Si and/or an (oxi)nitride of Al and/or alloys thereof may result from residual oxygen in the sputtering atmosphere or from a controlled content of added oxygen in said atmosphere. It is generally preferred if the oxygen content of the Si (oxi)nitride and/or Al (oxi)nitride is significantly lower than its nitrogen content, i.e. if the atomic ratio O/N in the layer is kept significantly below 1. It is most preferred to use Si nitride and/or Al nitride with negligible oxygen content for the base layer of the lower anti-reflection layer. This feature may be controlled by making sure that the refractive index of the layer does not differ significantly from the refractive index of an oxygen-free Si nitride and/or Al nitride layer.

It is within the scope of the invention to use mixed Si and/or Al targets or to otherwise add metals or semiconductors to the Si and/or Al component of this layer as long as the essential barrier and protection property of the base layer of the lower anti-reflection layer is not lost. It is well known and established to mix Al with Si targets, other mixed targets not being excluded. Additional components may be typically present in amounts of up to about 10-15 wt. %. Al is usually present in mixed Si targets in an amount of about 10 wt. %.

The at least one absorbing layer may be embedded in the base layer based on an (oxi)nitride of Si and/or an (oxi)nitride of Al and/or alloys thereof of the lower anti-reflection layer.

The base layer of the lower anti-reflection layer may be based on $TiO_x$ and/or $ZrO_x$ where x is from 1.5 to 2.0.

The layer based on a metal oxide, such as an oxide of Zn and Sn and/or an oxide of Sn of the lower anti-reflection layer serves to improve stability during a heat treatment by providing a dense and thermally stable layer and contributing to reduce the haze after a heat treatment. The layer based on a metal oxide, such as an oxide of Zn and Sn and/or an oxide of Sn of the lower anti-reflection layer may have a thickness of at least 0.5 nm, preferably from 0.5 to 10 nm, more preferably from 0.5 to 9 nm, even more preferably from 1 to 8 nm, even more preferably from 1 to 7 nm, even more preferably from 2 to 6 nm, even more preferably from 3 to 6 nm, most preferably from 3 to 5 nm. An upper thickness limit of about 8 nm is preferred due to optical interference conditions and by a reduction of heat treatability due to the resulting reduction in the thickness of the base layer that would be needed to maintain the optical interference boundary conditions for anti-reflecting the functional layer.

The layer based on a metal oxide, such as an oxide of Zn and Sn and/or an oxide of Sn of the lower anti-reflection layer is preferably located directly on the base layer based on an (oxi)nitride of Si and/or an (oxi)nitride of Al and/or alloys thereof.

The layer based on an oxide of Zn and Sn (abbreviation: $ZnSnO_x$) of the lower anti-reflection layer preferably comprises about 10-90 wt. % Zn and 90-10 wt. % Sn, more preferably about 40-60 wt. % Zn and about 40-60 wt. % Sn, preferably about 50 wt. % each of Zn and Sn, in wt. % of its total metal content. In some preferred embodiments the layer based on an oxide of Zn and Sn of the lower anti-reflection layer may comprise at most 18 wt. % Sn, more preferably at most 15 wt. % Sn, even more preferably at most 10 wt. % Sn. The layer based on an oxide of Zn and Sn may be deposited by reactive sputtering of a mixed ZnSn target in the presence of $O_2$.

The separation layer based on a metal oxide and/or an (oxi)nitride of silicon and/or an (oxi)nitride of aluminium and/or alloys thereof may have a thickness of at least 0.5 nm, preferably from 0.5 to 6 nm, more preferably from 0.5 to 5 nm, even more preferably from 0.5 to 4 nm, most preferably from 0.5 to 3 nm. These preferred thicknesses enable further improvement in haze upon heat treatment. The separation layer provides protection during the deposition process and during a subsequent heat treatment. The separation layer is either essentially fully oxidised immediately after its deposition, or it oxidizes to an essentially fully oxidized layer during deposition of a subsequent oxide layer.

When the separation layer is based on an (oxi)nitride of silicon and/or an (oxi)nitride of aluminium and/or alloys thereof, the at least one absorbing layer may be embedded in the separation layer.

The separation layer may be deposited using non-reactive sputtering from a ceramic target based on for instance a slightly substoichiometric titanium oxide, for example a $TiO_{1.98}$ target, as an essentially stoichiometric or as a slightly substoichiometric oxide, by reactive sputtering of a target based on Ti in the presence of $O_2$, or by depositing a thin layer based on Ti which is then oxidised. In the context of the present invention, an "essentially stoichiometric oxide" means an oxide that is at least 95% but at most 105% stoichiometric, whilst a "slightly substoichiometric oxide" means an oxide that is at least 95% but less than 100% stoichiometric.

When the separation layer is based on a metal oxide said separation layer may comprise a layer based on an oxide of Ti, NiCr, InSn, Zr, Al and/or Si.

In addition to the metal oxide and/or (oxi)nitride of silicon and/or (oxi)nitride of aluminium and/or alloys thereof on which it is based, the separation layer may further include one or more other chemical elements chosen from at least one of the following elements Ti, V, Mn, Co, Cu, Zn, Zr, Hf, Al, Nb, Ni, Cr, Mo, Ta, Si or from an alloy based on at least one of these materials, used for instance as dopants or alloyants.

The top layer based on an oxide of Zn primarily functions as a growth promoting layer for a subsequently deposited silver-based functional layer. The top layer based on an oxide of Zn is optionally mixed with metals such as Al or Sn in an amount of up to about 10 wt. % (wt. % referring to the target metal content). A typical content of said metals such as Al or Sn is about 2 wt. %, Al being actually preferred. ZnO and mixed Zn oxides have proven very effective as a growth promoting layer that assists in achieving a low sheet resistance at a given thickness of the subsequently deposited silver-based functional layer. It is preferred if the top layer of the lower anti-reflection layer is reactively sputtered from a Zn target in the presence of $O_2$ or if it is deposited by sputtering a ceramic target, e.g. based on ZnO:Al, in an atmosphere containing no or only a low amount, generally no more than about 5 vol. %, of oxygen. The top layer based on an oxide of Zn may have a thickness of at least 2 nm, preferably from 2 to 15 nm, more preferably from 4 to 12 nm, even more preferably from 5 to 10 nm, even more preferably from 5 to 9 nm.

The silver-based functional layer(s) may consist essentially of silver without any additive, as is normally the case in the area of low-e and/or solar control coatings. It is, however, within the scope of the invention to modify the properties of the silver-based functional layer(s) by adding doping agents, alloy additives or the like or even adding very thin metal or metal compound layers, as long as the properties of the silver-based functional layer(s) necessary for its (their) function as highly light-transmitting and low light-absorbent IR-reflective layer(s) are not substantially impaired thereby.

The thickness of a silver-based functional layer is dominated by its technical purpose. For typical low-e and/or solar control purposes the preferred layer thickness for a single silver-based layer is from 5 to 20 nm, more preferably from 5 to 15 nm, even more preferably from 5 to 12 nm, even more preferably from 7 to 11 nm, most preferably from 8 to 10 nm. With such a layer thickness light transmittance values of above 86% and a normal emissivity below 0.05 after a heat treatment can be easily achieved for single silver coatings. If better solar control properties are aimed at the thickness of the silver-based functional layer may be adequately increased or several spaced functional layers may be provided.

When the pane comprises two silver-based functional layers, the silver-based functional layer located furthest from the glass substrate may preferably have a thickness of from 5 to 25 nm, more preferably from 10 to 21 nm, even more preferably from 13 to 19 nm, even more preferably from 14 to 18 nm, most preferably from 15 to 17 nm.

When the pane comprises three silver-based functional layers, the two silver-based functional layers located furthest from the glass substrate may each independently preferably have a thickness of from 5 to 25 nm, more preferably from 10 to 21 nm, even more preferably from 13 to 19 nm, even more preferably from 14 to 18 nm, most preferably from 15 to 17 nm.

Preferably the top layer based on an oxide of Zn in the lower anti-reflection layer is in direct contact with the silver-based functional layer.

The central anti-reflection layer(s) may comprise at least a combination of one or more of the following layers: a layer based on an oxide of Zn and/or an oxide of Ti;
a layer based on an oxide of NiCr;
a layer based on a metal oxide, such as an oxide of Zn and Sn and/or an oxide of Sn; and
a layer based on an (oxi)nitride of Si, and/or an (oxi)nitride of Al, and/or alloys thereof, and/or an oxide of Al, Si, Ti, and/or Zr.

In some preferred embodiments each silver-based functional layer is spaced apart from an adjacent silver-based functional layer by a central anti-reflection layer, wherein each central anti-reflection layer comprises at least, in sequence from the silver-based functional layer that is located nearest to the glass substrate out of the silver-based functional layers that the central anti-reflection layer is located between,
a barrier layer based on an oxide of Zn;
a layer based on a metal oxide, such as an oxide of Zn and Sn and/or an oxide of Sn;
a layer based on an (oxi)nitride of Si, and/or an (oxi)nitride of Al, and/or alloys thereof,
and/or an oxide of Al, Si, Ti, and/or Zr, and
a top layer based on an oxide of Zn.

In some other preferred embodiments each silver-based functional layer is spaced apart from an adjacent silver-based functional layer by a central anti-reflection layer, wherein each central anti-reflection layer comprises at least, in sequence from the silver-based functional layer that is located nearest to the glass substrate out of the silver-based functional layers that the central anti-reflection layer is located between,
a barrier layer based on an oxide of NiCr;
a barrier layer based on an oxide of Zn;
a layer based on an (oxi)nitride of Si, and/or an (oxi)nitride of Al, and/or alloys thereof,
and/or an oxide of Al, Si, Ti, and/or Zr,
a layer based on a metal oxide, such as an oxide of Zn and Sn and/or an oxide of Sn; and
a top layer based on an oxide of Zn.

The at least one absorbing layer may be embedded in the layer based on an (oxi)nitride of Si and/or an (oxi)nitride of Al and/or alloys thereof of a central anti-reflection layer.

The layer based on an oxide of NiCr may preferably have a thickness of at least 0.3 nm, more preferably at least 0.4 nm, even more preferably at least 0.5 nm, most preferably at least 0.6 nm; but preferably at most 5 nm, more preferably at most 2 nm, even more preferably at most 1 nm, most preferably at most 0.9 nm. These preferred thicknesses enable further ease of deposition and improvement in optical characteristics such as haze whilst retaining mechanical durability.

The layer(s) based on an oxide of Zn and/or an oxide of Ti of the central anti-reflection layer may independently preferably have a thickness of at least 1 nm, more preferably at least 2 nm, even more preferably at least 3 nm, most preferably at least 3.5 nm; but preferably at most 10 nm, more preferably at most 7 nm, even more preferably at most 5 nm, most preferably at most 4 nm. These preferred thicknesses enable further ease of deposition and improvement in optical characteristics such as haze whilst retaining mechanical durability.

The layer based on a metal oxide, such as an oxide of Zn and Sn and/or an oxide of Sn of the central anti-reflection layer may preferably have a thickness of at least 5 nm, more preferably at least 10 nm, even more preferably at least 13 nm, most preferably at least 14 nm; but preferably at most 40 nm, more preferably at most 30 nm, even more preferably at most 25 nm, most preferably at most 21 nm.

The layer based on an (oxi)nitride of Si, and/or an (oxi)nitride of Al, and/or alloys thereof, and/or an oxide of Al, Si, Ti, and/or Zr of the central anti-reflection layer may preferably have a thickness of at least 5 nm, more preferably at least 15 nm, even more preferably at least 25 nm, most preferably at least 30 nm; but preferably at most 60 nm, more preferably at most 50 nm, even more preferably at most 45 nm, most preferably at most 40 nm.

The upper anti-reflection layer may comprise at least a combination of one or more of the following layers: a layer based on an oxide of NiCr;
a layer based on an oxide of Zn and/or an oxide of Ti;
a layer based on an (oxi)nitride of Si, and/or an (oxi)nitride of Al, and/or alloys thereof,
and/or an oxide of Al, Si, Ti, and/or Zr; and
a layer based on a metal oxide, such as an oxide of Zn and Sn and/or an oxide of Sn.

In some preferred embodiments the upper anti-reflection layer comprises at least, in sequence from the silver-based functional layer that is located furthest from the glass substrate,
a barrier layer based on an oxide of Zn;
a layer based on an (oxi)nitride of Si, and/or an (oxi)nitride of Al, and/or alloys thereof,
and/or an oxide of Al, Si, Ti, and/or Zr; and
a layer based on a metal oxide, such as an oxide of Zn and Sn and/or an oxide of Sn.

In some other preferred embodiments the upper anti-reflection layer comprises at least, in sequence from the silver-based functional layer that is located furthest from the glass substrate,
a barrier layer based on an oxide of NiCr;
a barrier layer based on an oxide of Zn;
a layer based on an (oxi)nitride of Si, and/or an (oxi)nitride of Al, and/or alloys thereof,
and/or an oxide of Al, Si, Ti, and/or Zr, and
a layer based on a metal oxide, such as an oxide of Zn and Sn and/or an oxide of Sn.

The at least one absorbing layer may be embedded in the layer based on an (oxi)nitride of Si and/or an (oxi)nitride of Al and/or alloys thereof of the upper anti-reflection layer.

The barrier layer based on an oxide of Zn and/or an oxide of Ti of the upper anti-reflection layer may preferably have a thickness of at least 1 nm, more preferably at least 2 nm, even more preferably at least 3 nm, most preferably at least 3.5 nm; but preferably at most 10 nm, more preferably at most 7 nm, even more preferably at most 5 nm, most preferably at most 4 nm. These preferred thicknesses enable further ease of deposition and improvement in optical characteristics such as haze whilst retaining mechanical durability.

It has been found that a superior protection of the silver-based functional layer(s) during the deposition process and a high optical stability during a heat treatment can be achieved if the barrier layer comprises a layer of a mixed metal oxide sputtered from a mixed metal oxide target. When the barrier layer is based on an oxide of Zn, said oxide may be a mixed metal oxide such as ZnO:Al. Good results are particularly achieved if a layer based on ZnO:Al is sputtered from a conductive ZnO:Al target. ZnO:Al may be deposited fully oxidized or such that it is slightly suboxidic. Preferably the ZnO:Al barrier layer is essentially stoichiometric. The use of essentially stoichiometric ZnO:Al barrier layers rather than metallic or less than 95% stoichiometric ZnO:Al barrier layers leads to an extremely high optical stability of the coating during a heat treatment and effectively assists in keeping optical modifications during a heat treatment small. Additionally the use of barrier layers based on essentially stoichiometric metal oxides provides benefits in terms of mechanical robustness.

When the barrier layer is based on an oxide of NiCr it is preferably deposited as a substoichiometric oxide. This enables the layer to act as an oxygen scavenger/absorber during a heat treatment.

At least a portion of a barrier layer that is in direct contact with a silver-based functional layer is preferably deposited using non-reactive sputtering of an oxidic target to avoid silver damage.

Preferably the barrier layers are deposited by non-reactive sputtering. Preferably the barrier layers are sputtered from ceramic targets. In the context of the present invention the term "non-reactive sputtering" includes sputtering an oxidic target in a low oxygen atmosphere (no or up to 5 vol.% oxygen) to provide an essentially stoichiometric oxide.

Where a barrier layer is based on $TiO_x$, x may be from 1.5 to 2.0.

The layer based on an (oxi)nitride of Si, and/or an (oxi)nitride of Al, and/or alloys thereof, and/or an oxide of Al, Si, Ti, and/or Zr of the upper anti-reflection layer may preferably have a thickness of at least 2 nm, more preferably at least 5 nm, even more preferably at least 10 nm, most preferably at least 15 nm; but preferably at most 40 nm, more preferably at most 35 nm, even more preferably at most 30 nm, most preferably at most 25 nm. Such thicknesses provide further improvement in terms of mechanical robustness of the coated pane. Said layer based on an (oxi)nitride of Si, and/or an (oxi)nitride of Al, and/or alloys thereof, and/or an oxide of Al, Si, Ti, and/or Zr may preferably be in direct contact with the barrier layer.

The layer based on an (oxi)nitride of Si, and/or an (oxi)nitride of Al, and/or alloys thereof, and/or an oxide of Al, Si, Ti, and/or Zr, which can in some cases make up a major part of the upper anti-reflection layer, provides stability (better protection during heat treatments) and diffusion barrier properties. Said layer is preferably deposited as an Al nitride and/or Si nitride layer by reactive sputtering of a Si, Al or mixed SiAl target, e.g. of a $Si_{90}Al_{10}$ target in a $N_2$ containing atmosphere. The composition of the layer based on an (oxi)nitride of Al and/or an (oxi)nitride of Si may be essentially stoichiometric $Si_{90}Al_{10}N_x$.

The layer based on a metal oxide, such as an oxide of Zn and Sn and/or an oxide of Sn of the upper anti-reflection layer may preferably have a thickness of at least 1 nm, more preferably at least 5 nm, even more preferably at least 7 nm, most preferably at least 9 nm; but preferably at most 20 nm, more preferably at most 15 nm, even more preferably at most 13 nm, most preferably at most 11 nm. Such thicknesses provide further improvement in terms of mechanical robustness of the coated pane. When said layer is an oxide of Zn and Sn it preferably comprises about 10-90 wt. % Zn and 90-10 wt. % Sn, more preferably about 40-60 wt. % Zn and about 40-60 wt. % Sn, preferably about 50 wt. % each of Zn and Sn, in wt. % of its total metal content. In some preferred embodiments said layer based on an oxide of Zn and Sn of the upper anti-reflection layer may comprise at most 18 wt. % Sn, more preferably at most 15 wt. % Sn, even more preferably at most 10 wt. % Sn. Said layer may be deposited by reactive sputtering of a mixed ZnSn target in the presence of $O_2$ and contributes to the anti-reflection properties of the upper anti-reflection layer.

The layer based on an (oxi)nitride of Si, and/or an (oxi)nitride of Al, and/or alloys thereof, and/or an oxide of Al, Si, Ti, and/or Zr of the upper anti-reflection layer may be in direct contact with the layer based on a metal oxide of the upper anti-reflection layer as defined herein without any intervening further dielectric layer.

Preferably the layer based on a metal oxide of the upper anti-reflection layer comprises a layer based on an oxide of Zn and Sn and/or an oxide of Sn.

The upper anti-reflection layer may have a total thickness of from 20 to 60 nm, preferably from 25 to 50 nm, more preferably from 30 to 50 nm, even more preferably from 35 to 45 nm.

A protective layer may be deposited as a top layer (outermost layer) of the upper anti-reflection layer for increased mechanical and/or chemical robustness, e.g. scratch resistance. Said protective layer may comprise a layer based on an oxide of Al, Si, Ti, and/or Zr.

To reduce the light transmittance increase during a heat treatment all individual layers of the upper, central and lower anti-reflection layers are preferably deposited with an essentially stoichiometric composition.

To further optimize the optical properties of the coated pane the upper and/or lower anti-reflection layers may comprise further partial layers consisting of suitable materials generally known for dielectric layers of low-e and/or solar control coatings, in particular chosen from one or more of the oxides of Sn, Ti, Zn, Nb, Ce, Hf, Ta, Zr, Al and/or Si and/or of (oxi)nitrides of Si and/or Al or combinations thereof. When adding such further partial layers it should however be verified that the heat treatability aimed at herein is not impaired thereby.

It will be appreciated that any further partial layer may contain additives that modify its properties and/or facilitate its manufacture, e.g. doping agents or reaction products of reactive sputtering gases. In the case of oxide based layers nitrogen may be added to the sputtering atmosphere leading to the formation of oxinitrides rather than oxides, in the case of nitride based layers oxygen may be added to the sputtering atmosphere, also leading to the formation of oxinitrides rather than nitrides.

Care must be taken by performing a proper material, structure and thickness selection when adding any such further partial layer to the basic layer sequence of the inventive pane that the properties primarily aimed at, e.g. a high thermal stability, are not significantly impaired thereby.

The invention is not limited to a specific production process for the coating. However, it is particularly preferred if at least one of the layers and most preferably all layers are applied by magnetron cathode sputtering, either in the DC mode, in the pulsed mode, in the medium frequency mode or in any other suitable mode, whereby metallic or semi-conducting targets are sputtered reactively or non-reactively in a suitable sputtering atmosphere. Depending on the materials to be sputtered planar or rotating tubular targets may be used.

The coating process is preferably carried out by setting up suitable coating conditions such that any oxygen (or nitrogen) deficit of any oxide (or nitride) layer of the anti-reflection layers of the coating is kept low to achieve a high stability of the light transmittance and colour of the coated glass panes during a heat treatment.

Light transmittance values referred to in the specification are generally specified with reference to a coated glass pane comprising a 4 mm thick standard float glass pane having a light transmittance $T_L$ of 89% without a coating.

The thermal stability of coated glass panes according to the invention is reflected by the fact that the heat treated coated glass panes do not exhibit unacceptable levels of haze. Large increases in the haze value if detected during a heat treatment would indicate that the coating is beginning to be damaged.

According to another aspect of the present invention there is provided a multiple glazing incorporating a coated glass pane in accordance with the present invention. For example the multiple glazing may be laminated glass or insulating glass.

It will be appreciated that optional features applicable to one aspect of the invention can be used in any combination, and in any number. Moreover, they can also be used with any of the other aspects of the invention in any combination and in any number. This includes, but is not limited to, the dependent claims from any claim being used as dependent claims for any other claim in the claims of this application.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention will now be further described by way of the following specific embodiments, which are given by way of illustration and not of limitation:

For all Examples the coatings were deposited on 4 mm thick standard float glass panes (10 cm×10 cm) with a light transmittance of about 89% using AC and/or DC magnetron sputtering devices, medium-frequency sputtering being applied where appropriate. Prior to coating, the glass was washed twice on a Benteler (RTM) washing machine.

All dielectric layers of an oxide of Zn and Sn ($ZnSnO_x$, weight ratio Zn:Sn≈50:50) were reactively sputtered from zinc-tin targets in an $Ar/O_2$ sputter atmosphere.

The ZnO:Al growth promoting top layers of the lower anti-reflection layers were sputtered from Al-doped Zn targets (Al content about 2 wt. %) in an $Ar/O_2$ sputter atmosphere.

The functional layers that in all Examples consisted of essentially pure silver (Ag) were sputtered from silver targets in an Ar sputter atmosphere without any added oxygen and at a partial pressure of residual oxygen below $10^{-5}$ mbar.

The barrier layers of Al-doped zinc oxide (ZnO:Al, ZAO) were sputtered from conductive $ZnO_x$:Al targets in a pure Ar sputter atmosphere without added oxygen.

The layers of mixed silicon aluminium nitride ($Si_{90}Al_{10}N_x$) were reactively sputtered from mixed $Si_{90}Al_{10}$ targets in an $Ar/N_2$ sputter atmosphere containing only residual oxygen. The layers of Al nitride were reactively sputtered from Al targets in an $Ar/N_2$ sputter atmosphere containing only residual oxygen.

The layers of $Fe_2Si_3$ were reactively sputtered from Fe and Si targets in a pure Ar sputter atmosphere without added oxygen.

The layers of $Fe_2Si_3N_x$ were reactively sputtered from Fe and Si targets in an $Ar/N_2$ sputter atmosphere containing only residual oxygen.

The layers of $NiSi_2$ were reactively sputtered from Ni and Si targets in a pure Ar sputter atmosphere without added oxygen.

The layers of $NiSi_2N_x$ were reactively sputtered from Ni and Si targets in an $Ar/N_2$ sputter atmosphere containing only residual oxygen.

TABLE 1

Haze score, light transmittance and reflection properties for a number of comparative coated glass panes and coated glass panes according to the present invention.

| Stack (First Layer Deposited On Glass) | Colour T (HT) | | Colour Rc (HT) | | | Colour Rg (AD) | | Colour Rg (HT) | | | % $T_L$ | | |
|---|---|---|---|---|---|---|---|---|---|---|---|---|---|
| | a* | b* | Y | a* | b* | a* | b* | Y | a* | b* | AD | HT | Haze |
| Example 1 (Comparative) $AlN_x$ 16.1 nm/$ZnSnO_x$ 4.5 nm/ZAO 5 nm/ Ag 9 nm/ZAO 3 nm/ $AlN_x$ 21.6 nm/$ZnSnO_x$ 10.1 nm | −2.38 | 2.17 | 4.82 | 3.1 | −13.95 | 1.39 | −13.50 | 5.51 | 2.70 | −13.88 | 86.48 | 88.18 | 0 |
| Example 2 (Comparative) $AlN_x$ 21 nm/$ZnSnO_x$ 5 nm/ZAO 8 nm/Ag 9 nm/ZAO 3.8 nm/ $ZnSnO_x$ 37 nm/$AlN_x$ 35 nm/ZAO 6.3 nm/ Ag 16 nm/ZAO 3.8 nm/$AlN_x$ 21 nm/ $ZnSnO_x$ 10 nm | −4.75 | 1.23 | 6.1 | 10.15 | 0.65 | 6.51 | −4.66 | 6.20 | 7.39 | −4.59 | 79.73 | 82.44 | 0/1 |
| Example 3 $AlN_x$ 21 nm/$ZnSnO_x$ 5 nm/ZAO 8 nm/Ag 9 nm/ZAO 3.8 nm/ $ZnSnO_x$ 37 nm/$AlN_x$ 17.5 nm/$Fe_2Si_3$ 5 nm/$AlN_x$ 17.5 nm/ ZAO 6.3 nm/Ag 16 nm/ZAO 3.8 nm/ $AlN_x$ 21 nm/$ZnSnO_x$ 10 nm | −6.12 | 1.3 | 16.7 | 9.65 | 0.51 | −3.56 | −4.25 | 9.5 | −4.48 | −4.43 | 40.07 | 43.27 | 1/2 |
| Example 4 $AlN_x$ 21 nm/$ZnSnO_x$ 5 nm/ZAO 8 nm/Ag 9 nm/ZAO 3.8 nm/ $ZnSnO_x$ 37 nm/$AlN_x$ 17.5 nm/$Fe_2Si_3$ 3.5 nm/$AlN_x$ 17.5 nm/ZAO 6.3 nm/Ag 16 nm/ZAO 3.8 nm/$AlN_x$ 21 nm/ $ZnSnO_x$ 10 nm | −5.87 | 1.51 | 12.62 | 10.24 | −1.63 | −3.41 | −5.52 | 7.40 | −3.41 | −7.20 | 48.58 | 52.32 | 1/2 |
| Example 5 $AlN_x$ 21 nm/$ZnSnO_x$ 5 nm/ZAO 8 nm/Ag 9 nm/ZAO 3.8 nm/ $ZnSnO_x$ 37 nm/$Fe_2Si_3$ 3.5 nm/$AlN_x$ 35 nm/ZAO 6.3 nm/Ag 16 nm/ZAO 3.8 nm/$AlN_x$ 21 nm/ $ZnSnO_x$ 10 nm | −5.01 | −1.22 | 5.68 | 14.79 | 2.76 | −2.51 | −11.73 | 8.74 | −2.08 | −8.11 | 52.31 | 60.96 | 2 |
| Example 6 $AlN_x$ 21 nm/$ZnSnO_x$ 5 nm/ZAO 8 nm/Ag 9 nm/ZAO 3.8 nm/ $ZnSnO_x$ 37 nm/$AlN_x$ 17.5 nm/$Fe_2Si_3N_x$ 14.5 nm/$AlN_x$ 17.5 nm/ ZAO 6.3 nm/Ag 16 nm/ ZAO 3.8 nm/$AlN_x$ 21 nm/ $ZnSnO_x$ 10 nm | −4.7 | 4.16 | 21.96 | 4.85 | −3.07 | 0.81 | 1.15 | 14.63 | 0.14 | −1.4 | 53.9 | 55.63 | 2 |

TABLE 1-continued

Haze score, light transmittance and reflection properties for a number of comparative coated glass panes and coated glass panes according to the present invention.

| Stack (First Layer Deposited On Glass) | Colour T (HT) | | | Colour Rc (HT) | | Colour Rg (AD) | | Colour Rg (HT) | | | % $T_L$ | | Haze |
|---|---|---|---|---|---|---|---|---|---|---|---|---|---|
| | a* | b* | Y | a* | b* | a* | b* | Y | a* | b* | AD | HT | |
| Example 7 $AlN_x$ 21 nm/$ZnSnO_x$ 5 nm/ZAO 8 nm/Ag 9 nm/ ZAO 3.8 nm/$ZnSnO_x$ 37 nm/$AlN_x$ 35 nm/ ZAO 6.3 nm/Ag 16 nm/ ZAO 3.8 nm/$AlN_x$ 10.5 nm/$Fe_2Si_3$ 3.5 nm/ $AlN_x$ 10.5 nm/$ZnSnO_x$ 10 nm | −6.1 | 5.69 | 2.81 | −4.71 | −0.71 | 8.66 | −15.72 | 10.63 | 10.14 | −15.70 | 49.91 | 56.25 | 1/2 |
| Example 8 $AlN_x$ 21 nm/$ZnSnO_x$ 5 nm/ZAO 8 nm/Ag 9 nm/ZAO 3.8 nm/ $ZnSnO_x$ 37 nm/$AlN_x$ 35 nm/ZAO 6.3 nm/Ag 16 nm/ZAO 3.8 nm/ $AlN_x$ 10.5 nm/$Fe_2Si_3N_x$ 14.5 nm/$AlN_x$ 10.5 nm/ $ZnSnO_x$ 10 nm | −3.75 | 12.75 | 5.95 | 8.41 | −30.37 | 0.1 | −29.53 | 15.37 | 2.59 | −30.5 | 58.69 | 62.79 | 2 |
| Example 9 (Comparative) $AlN_x$ 21 nm/$ZnSnO_x$ 5 nm/ZAO 8 nm/Ag 9 nm/$NiSi_2$ 4 nm/ZAO 3.8 nm/$ZnSnO_x$ 37 nm/ $AlN_x$ 35 nm/ZAO 6.3 nm/ Ag 16 nm/ZAO 3.8 nm/ $AlN_x$ 21 nm/$ZnSnO_x$ 10 nm | −3.64 | 1.09 | 9.01 | −7.79 | −4.9 | −5.8 | 1.3 | 13.49 | −9.35 | −1.73 | 58.53 | 69.56 | 4 |
| Example 10 (Comparative) $AlN_x$ 21 nm/$ZnSnO_x$ 5 nm/ZAO 8 nm/Ag 9 nm/ZAO 3.8 nm/ $ZnSnO_x$ 37 nm/$AlN_x$ 35 nm/$NiSi_2$ 4.5 nm/ ZAO 6.3 nm/Ag 16 nm/ ZAO 3.8 nm/$AlN_x$ 21 nm/ $ZnSnO_x$ 10 nm | −4.12 | −3.22 | 19.67 | −0.36 | 10.4 | 1.81 | −8.75 | 6.73 | −1.33 | −6.29 | 51.78 | 54.69 | 2/3 |
| Example 11 $AlN_x$ 21 nm/$ZnSnO_x$ 5 nm/ZAO 8 nm/ Ag 9 nm/ZAO 3.8 nm/ $ZnSnO_x$ 37 nm/$AlN_x$ 17.5 nm/$NiSi_2$ 4.0 nm/$AlN_x$ 17.5 nm/ZAO 6.3 nm/Ag 16 nm/ZAO 3.8 nm/$AlN_x$ 21 nm/ $ZnSnO_x$ 10 nm | −4.29 | −4.06 | 17.83 | 3.09 | 10.24 | −3.75 | 2.32 | 6.43 | −6.66 | 2.85 | 48.54 | 51.51 | 2 |
| Example 12 $AlN_x$ 21 nm/$ZnSnO_x$ 5 nm/ZAO 8 nm/Ag 9 nm/ZAO 3.8 nm/ $ZnSnO_x$ 37 nm/$AlN_x$ 17.5 nm/$NiSi_2$ 3.7 nm/ $AlN_x$ 17.5 nm/ZAO 6.3 nm/Ag 16 nm/ ZAO 3.8 nm/$AlN_x$ 21 nm/$ZnSnO_x$ 10 nm | −4.25 | −3.32 | 16.63 | 4.59 | 4.97 | −1.87 | −0.54 | 7.5 | −4.44 | 0.48 | 52.51 | 55.83 | 2 |
| Example 13 $AlN_x$ 21 nm/$ZnSnO_x$ 5 nm/ZAO 8 nm/Ag 9 nm/ZAO 3.8 nm/ $ZnSnO_x$ 37 nm/$AlN_x$ 27.5 nm/$NiSi_2$ 4.0 nm/ $AlN_x$ 7.5 nm/ZAO 6.3 nm/Ag 16 nm/ZAO 3.8 nm/$AlN_x$ 21 nm/ $ZnSnO_x$ 10 nm | −4.2 | −2.56 | 17.18 | 1.79 | 7.37 | −0.13 | −2.77 | 6.15 | −2.56 | −1.06 | 52.84 | 55.93 | 1/2 |

TABLE 1-continued

Haze score, light transmittance and reflection properties for a number of comparative coated glass panes and coated glass panes according to the present invention.

| Stack (First Layer Deposited On Glass) | Colour T (HT) a* | Colour T (HT) b* | Colour T (HT) Y | Colour Rc (HT) a* | Colour Rc (HT) b* | Colour Rg (AD) a* | Colour Rg (AD) b* | Colour Rg (HT) Y | Colour Rg (HT) a* | Colour Rg (HT) b* | % T$_l$ AD | % T$_l$ HT | Haze |
|---|---|---|---|---|---|---|---|---|---|---|---|---|---|
| Example 14 AlN$_x$ 21 nm/ZnSnO$_x$ 5 nm/ZAO 8 nm/Ag 9 nm/ZAO 3.8 nm/ ZnSnO$_x$ 37 nm/AlN$_x$ 7.5 nm/NiSi$_2$ 4.0 nm/ AlN$_x$ 27.5 nm/ZAO 6.3 nm/Ag 16 nm/ZAO 3.8 nm/AlN$_x$ 21 nm/ ZnSnO$_x$ 10 nm | −5.04 | −1.71 | 15.08 | 6.42 | 10.04 | −4.27 | 0.85 | 8.95 | −7 | 1.14 | 47.06 | 50.64 | 1 |
| Example 15 AlN$_x$ 21 nm/ZnSnO$_x$ 5 nm/ZAO 8 nm/Ag 9 nm/ZAO 3.8 nm/ ZnSnO$_x$ 37 nm/AlN$_x$ 20 nm/NiSi$_2$ 4.0 nm/ AlN$_x$ 15 nm/ZAO 6.3 nm/ Ag 16 nm/ZAO 3.8 nm/ AlN$_x$ 21 nm/ZnSnO$_x$ 10 nm | −4.53 | −2.41 | 17.36 | 4.56 | 3.1 | −1.43 | 0.01 | 7.09 | −3.49 | 0.38 | 48.57 | 54.42 | 2 |
| Example 16 AlN$_x$ 21 nm/ZnSnO$_x$ 5 nm/ZAO 8 nm/Ag 9 nm/ ZAO 3.8 nm/ZnSnO$_x$ 37 nm/AlN$_x$ 25 nm/NiSi$_2$ 4.2 nm/AlN$_x$ 10 nm/ZAO 6.3 nm/Ag 16 nm/ZAO 3.8 nm/AlN$_x$ 21 nm/ ZnSnO$_x$ 10 nm | −4.24 | −2.59 | 18.57 | 3.61 | 2.43 | 0.42 | −2.31 | 6.45 | −1.59 | −1.77 | 51.29 | 54.24 | 2 |
| Example 17 AlN$_x$ 21 nm/ZnSnO$_x$ 5 nm/ZAO 8 nm/Ag 9 nm/ ZAO 3.8 nm/ZnSnO$_x$ 37 nm/AlN$_x$ 17.5 nm/ NiSi$_2$N$_x$ 9 nm/AlN$_x$ 17.5 nm/ZAO 6.3 nm/ Ag 16 nm/ZAO 3.8 nm/ AlN$_x$ 21 nm/ZnSnO$_x$ 10 nm | −4.26 | −1.58 | 20.48 | 4.17 | 9.06 | −1.38 | 3.84 | 11.79 | −1.52 | 6.04 | 54.92 | 54.54 | 2 |
| Example 18 AlN$_x$ 21 nm/ZnSnO$_x$ 5 nm/ZAO 8 nm/Ag 9 nm/ ZAO 3.8 nm/ZnSnO$_x$ 37 nm/AlN$_x$ 27.5 nm/ NiSi$_2$N$_x$ 9.0 nm/AlN$_x$ 7.5 nm/ZAO 6.3 nm/ Ag 16 nm/ZAO 3.8 nm/ AlN$_x$ 21 nm/ZnSnO$_x$ 10 nm | −3.52 | −4.28 | 20.36 | 2.48 | 6.71 | 0.44 | −0.55 | 9.8 | −1.32 | 0.37 | 58.45 | 60.03 | 1 |
| Example 19 (Comparative) AlN$_x$ 21 nm/ZnSnO$_x$ 5 nm/ZAO 8 nm/Ag 9 nm/ ZAO 3.8 nm/ZnSnO$_x$ 37 nm/AlN$_x$ 35 nm/ZAO 6.3 nm/Ag 16 nm/NiSi$_2$ 4 nm/ZAO 3.8 nm/AlN$_x$ 21 nm/ZnSnO$_x$ 10 nm | −6.75 | −7.78 | 18.34 | 1.99 | 14.49 | 1.9 | −19 | 13.22 | −0.84 | −5.96 | 55.74 | 58.36 | 5+ |
| Example 20 (Comparative) AlN$_x$ 21 nm/ZnSnO$_x$ 5 nm/ZAO 8 nm/Ag 9 nm/ ZAO 3.8 nm/ZnSnO$_x$ 37 nm/AlN$_x$ 35 nm/ZAO 6.3 nm/Ag 16 nm/ZAO 3.8 nm/NiSi$_2$ 4 nm/ZAO 3.8 nm/AlN$_x$ 21 nm/ZnSnO$_x$ 10 nm | −4.77 | 2.21 | 8.32 | 3.8 | 4.67 | 2.94 | −23.34 | 11.65 | 3.08 | −21 | 56.7 | 60.78 | 4/5 |
| Example 21 Single layer of Fe/Si 40:60 atomic ratio 3.9 nm | −1.45 | 2.39 | 10.57 | −1.2 | −5.62 | 0.08 | −1.37 | 9.21 | −0.93 | 0.12 | 57.23 | 87.21 | 1 |
| Example 22 Single layer of Fe/Si 20:80 atomic ratio 3.7 nm | −1.34 | 0.93 | 8.55 | −0.38 | −1.49 | −0.73 | −1.25 | 7.34 | −0.32 | −0.72 | 54.7 | 85.21 | 0 |
| Example 23 Single layer of Fe/Si 50:50 atomic ratio 4.2 nm | −1.22 | 4.1 | 9.69 | −0.99 | −4.48 | 0.05 | 0.32 | 8.79 | −0.74 | −0.85 | 50.77 | 84.87 | 0 |

TABLE 1-continued

Haze score, light transmittance and reflection properties for a number of comparative coated glass panes and coated glass panes according to the present invention.

| Stack (First Layer Deposited On Glass) | Colour T (HT) | | Colour Rc (HT) | | | Colour Rg (AD) | | Colour Rg (HT) | | | % T$_L$ | | Haze |
|---|---|---|---|---|---|---|---|---|---|---|---|---|---|
| | a* | b* | Y | a* | b* | a* | b* | Y | a* | b* | AD | HT | |
| Example 24 AlN$_x$ 35 nm/Fe/Si 40:60 atomic ratio 3.9 nm/AlN$_x$ 35 nm | −1.13 | −3.26 | 18.92 | −0.59 | 8.4 | −2.87 | 1.32 | 17.68 | −2.62 | 1.44 | 58.18 | 59.45 | 0 |
| Example 25 AlN$_x$ 35 nm/Fe/Si 60:40 atomic ratio 3.5 nm/AlN$_x$ 35 nm | −0.88 | −2.31 | 20.61 | −0.87 | 2.27 | −2.25 | −3.88 | 15.43 | −2.17 | −2.72 | 53.94 | 52.9 | 1 |
| Example 26 AlN$_x$ 35 nm/Fe/Si 20:80 atomic ratio 3.7 nm/AlN$_x$ 35 nm | −0.16 | 3.3 | 27.41 | −1.76 | −0.31 | −2.74 | −0.93 | 23.69 | −2.94 | −1.83 | 53.16 | 56.9 | 0 |
| Example 27 AlN$_x$ 35 nm/Fe/Si 50:50 atomic ratio 4.2 nm/AlN$_x$ 35 nm | −0.97 | −3.26 | 19.08 | −0.91 | 3.37 | −2.74 | −0.71 | 15.8 | −2.6 | −1.77 | 54.69 | 56.26 | 2 |
| Example 28 AlN$_x$ 35 nm/Fe/Si 70:30 atomic ratio 4.1 nm/AlN$_x$ 35 nm | −0.94 | −3.78 | 18.52 | −0.53 | 7.13 | −2.51 | −0.77 | 15.6 | −2.55 | 0.12 | 54.27 | 53.13 | 2 |
| Example 29 AlN$_x$ 35 nm/Fe/Si 55:45 atomic ratio 4.0 nm/AlN$_x$ 35 nm | −0.86 | −3.85 | 18.55 | −0.88 | 6.85 | −2.73 | −0.57 | 15.97 | −2.63 | −0.18 | 55.44 | 55.9 | 2 |

Where: AD = as deposited, HT = after heat treatment, Colour T = colour in transmission, Colour Rc = colour in reflection when viewed from the coated side of the pane, Colour Rg = colour in reflection when viewed from the non-coated (glass) side of the pane, and % T$_L$ = percentage light transmittance. The methodology used to collect the data in Table 1 is set out below. In Table 1, for each example the layers were deposited onto a glass pane in sequence starting with the first layer shown.

Heat Treatability Tests

After the deposition of the coatings of Examples 1-29, T$_L$ and Colour Rg were measured and the samples were heat treated at about 650° C. for about 5 minutes. Thereafter haze, T$_L$, Colour T, Colour Rc, and Colour Rg were measured. The results are listed in Table 1 above.

The values stated for the % light transmittance % T$_L$ of the coated glass panes in the Examples 1-29 were derived from measurements according to EN 140. The colour characteristics were measured and reported using the well established CIE LAB a*, b* coordinates (see e.g. [0030] and [0031] in WO 2004-063 111 A1). For relatively neutral colours it is generally preferred that each of the colour characteristics −15≤(a* or b*)≤15.

A subjective visible haze scoring system was applied to the Examples. The quality assessment system described hereinafter was found to be needed to distinguish better the visual quality of coatings under bright light conditions, properties that are not fully reflected by standard haze values measured in accordance with ASTM D 1003-61. The evaluation system considers the more macroscopic effect of visible faults in the coating which cause local colour variations where the coating is damaged or imperfect (haze score in Table 1). Macroscopic effects of visible faults in the coating after a heat treatment (all examples exhibit no haze before a heat treatment) were assessed subjectively by viewing samples under bright light. The evaluation is based upon a perfectness scoring (rating) system using scores between 0 (perfect, no faults) through to 3 (high number of clearly visible faults and/or spots) up to 5 (dense haze, often already visible to the naked eye), rating the visual appearance of the coated glass samples after a heat treatment.

The visual evaluation was carried out by using a 2.5 million candela power beam (torch) that is directed at incidence angles between about −90° to about +90° (relative to normal incidence) in two orthogonal planes (i.e. turning the torch first in a horizontal plane and then in a vertical plane) onto a coated glass pane that is arranged in front of a black box. The black box has a sufficiently large size such that several coated glass samples can be evaluated at the same time. The coated glass panes are observed and their visual quality was assessed by varying the angle of incidence as described above, by directing the light beam from the observer through the coated glass panes. The coated glass panes were arranged in front of the black box such that their coating faced the observer. Heat treated coated glass panes with any score ≥3 are considered as having failed the test.

Summary of Results

Comparative examples 1 and 2 are panes coated with stacks that do not contain an absorbing layer as required by the present invention. Therefore these two comparative examples exhibit much higher light transmittance than the other examples.

Examples 3 and 4 are panes coated with stacks that contain a layer of Fe$_2$Si$_3$ embedded between AlN$_x$ layers in a central anti-reflection layer. Only a thin layer of Fe$_2$Si$_3$ is required to achieve high visible light absorption. The haze is acceptable and the colour characteristics are relatively neutral.

Example 5 is a pane coated with a stack that contains a layer of Fe$_2$Si$_3$ contacting an AlN$_x$ layer in a central anti-reflection layer. Again, only a thin layer of Fe$_2$Si$_3$ is required to achieve high visible light absorption. The haze is acceptable and the colour characteristics are relatively neutral.

Examples 6 and 8 are panes coated with stacks that contain a layer of Fe$_2$Si$_3$N$_x$ embedded between AlN$_x$ layers in a central anti-reflection layer and an upper anti-reflection layer respectively. A thicker layer of Fe$_2$Si$_3$N$_x$ is necessary to achieve comparable visible light absorption to that achieved with the use of a layer of Fe$_2$Si$_3$. The haze is acceptable. Some of the colour values for example 8 are not ideal in terms of neutrality.

Example 7 is a pane coated with a stack that contains a layer of $Fe_2Si_3$ embedded between $AlN_x$ layers in an upper anti-reflection layer. Again, only a thin layer of $Fe_2Si_3$ is required to achieve high visible light absorption. The haze is acceptable and the colour characteristics are generally relatively neutral.

Comparative Example 9 is a pane coated with a stack that contains a layer of $NiSi_2$ located between layers of Ag and ZAO in a central anti-reflection layer. This example exhibits unacceptable haze.

Comparative Example 10 is a pane coated with a stack that contains a layer of $NiSi_2$ located between layers of $AlN_x$ and ZAO in a central anti-reflection layer. This example also exhibits unacceptable haze.

Examples 11-16 are panes coated with stacks that contain a layer of $NiSi_2$ embedded between $AlN_x$ layers in a central anti-reflection layer. Examples 11 and 12 use different thicknesses of the $NiSi_2$ layer and each of examples 13-16 embeds the layer of $NiSi_2$ between two $AlN_x$ layers that have a different thickness from each other. The haze is acceptable and the colour characteristics are relatively neutral in all cases. These examples show that the thicknesses of the $AlN_x$ layers are not crucial for functionality.

Examples 17 and 18 are panes coated with stacks that contain a layer of $NiSi_2N_x$ embedded between $AlN_x$ layers in a central anti-reflection layer. Example 18 embeds the layer of $NiSi_2N_x$ between two $AlN_x$ layers that have a different thickness from each other. A thicker layer of $NiSi_2N_x$ is necessary to achieve comparable visible light absorption to that achieved with the use of a layer of $NiSi_2$. The haze is acceptable and the colour values are generally acceptable in terms of relative neutrality.

Comparative Examples 19 and 20 are panes coated with stacks that contain a layer of $NiSi_2$ located in an upper anti-reflection layer. In Comparative Example 19 the layer of $NiSi_2$ is located between layers of Ag and ZAO, and in Comparative Example 20 the layer of $NiSi_2$ is embedded between layers of ZAO. Both of these Comparative Examples exhibit unacceptable haze.

Examples 21-23 are panes coated with single layers of Fe/Si of varying atomic ratios. These coated panes exhibit high light absorption before heat treatment and excellent haze. These coated panes also exhibit essentially neutral colours which demonstrates that these Fe/Si layers would not per se adversely affect the colour neutrality of a multi-layer coated pane.

Examples 24-29 are panes coated with single layers of Fe/Si of varying atomic ratios embedded between $AlN_x$ layers. These coated panes exhibit high light absorption, acceptable haze characteristics and generally essentially neutral colours.

It is worth noting that the thicknesses of the layers in the stacks of Examples 3-20 have not been optimised for inclusion of the absorbing layer, i.e. more neutral colour values could be obtained by altering the dielectric layer thicknesses.

The invention is not restricted to the details of the foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A heat treated coated glass pane comprising at least the following layers:
    a glass substrate; and
    a lower anti-reflection layer; wherein the lower anti-reflection layer comprises in sequence from the glass substrate;
        a base layer based on an (oxi)nitride of Silicon and/or an (oxi)nitride of Aluminium and/or alloys thereof; and/or an oxide of Titanium; and/or an oxide of Zirconium located directly on the glass substrate;
        a layer based on an oxide of Zinc and Tin and/or an oxide of Tin; and
        a top layer based on an oxide of Zinc;
    a silver-based functional layer; located directly on the top layer based on an oxide of Zinc; and
    a further anti-reflection layer located above the silver-based functional layer and comprising:
    a barrier layer located directly on the silver-based functional layer; and
    at least one absorbing layer based on one or more of $Fe_2Si_3$, $FeSi_n$, where n is any integer or fraction greater than or equal to 1 but less than 2 or greater than 2 but up to 9, and/or $Fe_mSi$, where m is any integer or fraction from 1 to 9, and/or nitrides thereof; and
    at least one layer based on an (oxi)nitride of Si and/or an (oxi)nitride of Al and/or alloys thereof, and wherein the at least one absorbing layer contacts directly the at least one layer based on an (oxi)nitride of Si and/or an (oxi)nitride of Al and/or alloys thereof; and wherein the thickness of the absorbing layer ranges from 0.5 to 12 nm; and
    wherein after heat treatment the coated glass pane comprises neutral color characteristics according to CIE LAB a*, b* coordinates such that $-15 \leq (a* $ or $ b*) \leq 15$; and
    wherein the percentage light transmission for the coated glass pane after heat treatment is less than 63%.

2. The coated glass pane according to claim 1, wherein the at least one absorbing layer is embedded between and contacts two layers based on an (oxi)nitride of Si and/or an (oxi)nitride of Al and/or alloys thereof.

3. The coated glass pane according to claim 1, wherein where the at least one absorbing layer is based on $FeSi_n$ and/or nitrides thereof, n is any integer or fraction from 1 to 1.95 or greater than 2.05 but up to 9.

4. The coated glass pane according to claim 1, wherein the at least one absorbing layer contacts directly at least one layer based on a nitride of Al.

5. The coated glass pane according to claim 1, wherein the at least one absorbing layer is embedded between and contacts directly two layers based on a nitride of Al.

6. The coated glass pane according to claim 1, wherein the pane comprises more than one silver-based functional layer and wherein each silver-based functional layer is spaced apart from an adjacent silver-based functional layer by a central anti-reflection layer.

7. The coated glass pane according to claim 6, wherein the at least one absorbing layer is located in the central anti-reflection layer.

8. The coated glass pane according to claim 1, wherein the at least one absorbing layer is located in the further anti-reflection layer.

9. The coated glass pane according to claim 1, wherein the at least one absorbing layer has a thickness in the range of 1 nm to 10 nm.

10. The coated glass pane according to claim 1, wherein the layer(s) based on an (oxi)nitride of Si and/or an (oxi)nitride of Al and/or alloys thereof each independently have a thickness of at least 5 nm but at most 25 nm.

11. A multiple glazing incorporating a coated glass pane in accordance with claim 1.

12. The coated glass pane according to claim 1, wherein where the at least one absorbing layer is based on $FeSi_n$ and/or nitrides thereof, n is any integer or fraction from 1 to 1.90 or greater than 2.10 but up to 9.

13. A heat treated coated glass pane comprising at least the following layers:
- a glass substrate; and
- a lower anti-reflection layer; wherein the lower anti-reflection layer comprises in sequence from the glass substrate;
  - a base layer based on an (oxi)nitride of Silicon and/or an (oxi)nitride of Aluminium and/or alloys thereof; and/or an oxide of Titanium; and/or an oxide of Zirconium located directly on the glass substrate;
  - a layer based on an oxide of Zinc and Tin and/or an oxide of Tin; and
  - a top layer based on an oxide of Zinc;
- a silver-based functional layer; located directly on the top layer based on an oxide of Zinc; and
- a further anti-reflection layer located above the silver-based functional layer and comprising:
- a barrier layer located directly on the silver-based functional layer; and
- at least one absorbing layer consisting of one or more of:
  $Fe_2Si_3$,
  $FeSi_n$, where n is any integer or fraction greater than or equal to 1 but less than 2 or greater than 2 but up to 9, and/or
  $Fe_mSi$, where m is any integer or fraction from 1 to 9, and/or nitrides thereof; and
- at least one layer based on an (oxi)nitride of Si and/or an (oxi)nitride of Al and/or alloys thereof, and wherein
- the at least one absorbing layer contacts directly the at least one layer based on an (oxi)nitride of Si and/or an (oxi)nitride of Al and/or alloys thereof; and wherein
- the thickness of the absorbing layer ranges from 0.5 to 12 nm; and
- wherein after heat treatment the coated glass pane comprises neutral colour characteristics according to CIE LAB a*, b* coordinates such that $-15 \leq (a^* \text{ or } b^*) \leq 15$; and
- wherein the percentage light transmission for the coated glass pane after heat treatment is less than 63%.

* * * * *